(12) United States Patent
Amalfitano et al.

(10) Patent No.: US 9,306,658 B2
(45) Date of Patent: *Apr. 5, 2016

(54) METHOD AND APPARATUS FOR A SPECTRALLY COMPLIANT CELLULAR COMMUNICATION SYSTEM

(71) Applicant: IPR Licensing, INC., Wilmington, DE (US)

(72) Inventors: Carlo Amalfitano, Melbourne Beach, FL (US); James A. Proctor, Melbourne Beach, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,340

(22) Filed: May 19, 2014

(65) Prior Publication Data

US 2014/0254563 A1 Sep. 11, 2014

Related U.S. Application Data

(60) Continuation of application No. 12/183,780, filed on Jul. 31, 2008, now Pat. No. 8,755,360, which is a division of application No. 10/409,031, filed on Apr. 7, 2003, now Pat. No. 8,463,255, which is a continuation-in-part of application No. 09/467,353, filed on Dec. 20, 1999, now Pat. No. 6,545,990.

(51) Int. Cl.
*H04B 7/216* (2006.01)
*H04W 76/02* (2009.01)
(Continued)

(52) U.S. Cl.
CPC ...... *H04B 7/216* (2013.01); *H04L 1/00* (2013.01); *H04L 25/00* (2013.01); *H04W 76/02* (2013.01)

(58) Field of Classification Search
CPC ...... H04W 76/02; H04W 92/20; H04B 7/216; H04B 1/00; H04B 25/00; H04J 13/00; H04J 13/0044; H04J 13/18; H04L 1/00; H04L 25/00
USPC ......... 370/208, 209, 320, 328, 329, 335, 341, 370/342
See application file for complete search history.

(56) References Cited

U.S. PATENT DOCUMENTS

| | | | |
|---|---|---|---|
| 4,675,863 | A | 6/1987 | Paneth et al. |
| 4,817,089 | A | 3/1989 | Paneth et al. |

(Continued)

FOREIGN PATENT DOCUMENTS

| | | |
|---|---|---|
| EP | 0526106 | 2/1993 |
| EP | 0682423 | 11/1995 |

(Continued)

OTHER PUBLICATIONS

"Ericsson Receives $77 Million Order for D-AMPS IS-136 Network Expansion in Argentina," Business Wire (Aug. 18, 1998) (available at: http://www.thefreelibrary.com/Ericsson+Receives+$77+Million+Order+For+D-AMPS+IS-136+Network...-a050251732 (last visited Jul. 8, 2009).

(Continued)

*Primary Examiner* — Olumide T Ajibade Akonai
(74) *Attorney, Agent, or Firm* — Volpe and Koenig P.C.

(57) ABSTRACT

A system for wireless data transmission that uses a channel bandwidth, channel separation, and radio frequency power spectrum which is compatible with existing deployments of wireless voice services. The transmitted waveforms are thus compatible with existing cellular networks. However, the time domain digital coding, modulation, and power control schemes are optimized for data transmission. Existing cellular network sites can thus be used to provide a high speed service optimized for wireless data traffic without the need for new radio frequency planning, and without interfering with existing voice service deployments.

18 Claims, 6 Drawing Sheets

(51) Int. Cl.
*H04L 1/00* (2006.01)
*H04L 25/00* (2006.01)

(56) References Cited

U.S. PATENT DOCUMENTS

| | | | |
|---|---|---|---|
| 4,912,705 A | 3/1990 | Paneth et al. |
| 5,022,024 A | 6/1991 | Paneth et al. |
| 5,114,375 A | 5/1992 | Wellhausen et al. |
| 5,282,222 A | 1/1994 | Fattouche et al. |
| 5,319,634 A | 6/1994 | Bartholomew et al. |
| 5,325,419 A | 6/1994 | Connolly et al. |
| 5,369,664 A | 11/1994 | Takahashi et al. |
| 5,373,502 A | 12/1994 | Turban |
| 5,412,429 A | 5/1995 | Glover |
| 5,442,625 A | 8/1995 | Gitlin et al. |
| 5,511,067 A | 4/1996 | Miller |
| 5,585,850 A | 12/1996 | Schwaller |
| 5,592,470 A | 1/1997 | Rudrapatna et al. |
| 5,617,423 A | 4/1997 | Li et al. |
| 5,642,348 A | 6/1997 | Barzegar et al. |
| 5,655,001 A | 8/1997 | Cline et al. |
| 5,657,358 A | 8/1997 | Paneth et al. |
| 5,663,990 A | 9/1997 | Bolgiano et al. |
| 5,673,259 A | 9/1997 | Quick |
| 5,687,194 A | 11/1997 | Paneth et al. |
| 5,697,059 A | 12/1997 | Carney |
| 5,734,646 A | 3/1998 | I et al. |
| 5,777,990 A | 7/1998 | Zehavi et al. |
| 5,784,406 A | 7/1998 | DeJaco et al. |
| 5,790,551 A | 8/1998 | Chan |
| 5,828,659 A | 10/1998 | Teder et al. |
| 5,828,662 A | 10/1998 | Jalali et al. |
| 5,844,894 A | 12/1998 | Dent |
| 5,856,971 A | 1/1999 | Gitlin et al. |
| 5,859,840 A | 1/1999 | Tiedemann et al. |
| 5,883,899 A | 3/1999 | Dahlman et al. |
| 5,909,436 A | 6/1999 | Engstrom et al. |
| 5,910,945 A | 6/1999 | Garrison et al. |
| 5,914,950 A | 6/1999 | Tiedemann et al. |
| 5,923,650 A | 7/1999 | Chen et al. |
| 5,930,230 A | 7/1999 | Odenwalder et al. |
| 5,950,131 A | 9/1999 | Vilmur |
| 5,956,345 A | 9/1999 | Allpress et al. |
| 5,983,078 A | 11/1999 | Bossard |
| 5,991,279 A | 11/1999 | Haugli et al. |
| 6,005,855 A | 12/1999 | Zehavi et al. |
| 6,028,868 A | 2/2000 | Yeung et al. |
| 6,044,073 A | 3/2000 | Seshadri et al. |
| 6,064,678 A | 5/2000 | Sindhushayana et al. |
| 6,069,883 A | 5/2000 | Ejzak et al. |
| 6,078,572 A | 6/2000 | Tanno et al. |
| 6,088,335 A | 7/2000 | I et al. |
| 6,097,733 A | 8/2000 | Basu et al. |
| 6,112,092 A | 8/2000 | Benveniste |
| 6,134,233 A | 10/2000 | Kay |
| 6,148,208 A | 11/2000 | Love |
| 6,157,619 A | 12/2000 | Ozluturk et al. |
| 6,161,013 A | 12/2000 | Anderson et al. |
| 6,185,246 B1 | 2/2001 | Gilhousen |
| 6,195,362 B1 | 2/2001 | Darcie et al. |
| 6,201,797 B1 | 3/2001 | Leuca et al. |
| 6,208,871 B1 | 3/2001 | Hall et al. |
| 6,215,798 B1 | 4/2001 | Carneheim et al. |
| 6,222,828 B1 | 4/2001 | Ohlson et al. |
| 6,226,317 B1 | 5/2001 | Bruckert et al. |
| 6,243,372 B1 | 6/2001 | Petch et al. |
| 6,259,683 B1 | 7/2001 | Sekine et al. |
| 6,262,980 B1 | 7/2001 | Leung et al. |
| 6,263,205 B1 | 7/2001 | Yamaura et al. |
| 6,269,088 B1 | 7/2001 | Masui et al. |
| 6,272,168 B1 | 8/2001 | Lomp et al. |
| 6,285,665 B1 | 9/2001 | Chuah |
| 6,307,840 B1 | 10/2001 | Wheatley et al. |
| 6,308,082 B1 | 10/2001 | Kronestedt et al. |
| 6,335,922 B1 | 1/2002 | Tiedemann et al. |
| 6,366,570 B1 | 4/2002 | Bhagalia |
| 6,373,830 B1 | 4/2002 | Ozluturk |
| 6,373,834 B1 | 4/2002 | Lundh et al. |
| 6,377,548 B1 | 4/2002 | Chuah |
| 6,377,809 B1 | 4/2002 | Rezaiifar et al. |
| 6,389,000 B1 | 5/2002 | Jou |
| 6,396,804 B2 | 5/2002 | Odenwalder |
| 6,404,802 B1 | 6/2002 | Kang et al. |
| 6,418,148 B1 | 7/2002 | Kumar et al. |
| 6,449,468 B1 | 9/2002 | Remy |
| 6,456,608 B1 | 9/2002 | Lomp |
| 6,469,991 B1 | 10/2002 | Chuah |
| 6,473,623 B1 | 10/2002 | Benveniste |
| 6,496,531 B1 | 12/2002 | Kamel et al. |
| 6,504,830 B1 | 1/2003 | Östberg et al. |
| 6,519,651 B1 | 2/2003 | Dillon |
| 6,526,039 B1 | 2/2003 | Dahlman et al. |
| 6,532,365 B1 | 3/2003 | Anderson et al. |
| 6,545,986 B1 | 4/2003 | Stellakis |
| 6,567,416 B1 | 5/2003 | Chuah |
| 6,570,865 B2 | 5/2003 | Masui et al. |
| 6,571,296 B1 | 5/2003 | Dillon |
| 6,574,211 B2 | 6/2003 | Padovani et al. |
| 6,597,913 B2 | 7/2003 | Natarajan |
| 6,665,308 B1 | 12/2003 | Rakib et al. |
| 6,697,984 B1 | 2/2004 | Sim et al. |
| 6,714,522 B1 | 3/2004 | Lee |
| 6,724,740 B1 | 4/2004 | Choi et al. |
| 6,775,254 B1 | 8/2004 | Willenegger et al. |
| 6,785,323 B1 | 8/2004 | Proctor |
| 6,839,557 B1 | 1/2005 | Bonnard et al. |
| 7,072,325 B1 | 7/2006 | Sato |
| 7,590,091 B2 | 9/2009 | Lee et al. |
| 2003/0073410 A1 | 4/2003 | Hottinen et al. |

FOREIGN PATENT DOCUMENTS

| | | |
|---|---|---|
| EP | 0701337 | 3/1996 |
| EP | 0719062 | 6/1996 |
| EP | 1083759 | 3/2001 |
| EP | 1209930 | 9/2001 |
| GB | 2 331 202 | 5/1999 |
| JP | 08-163102 | 6/1996 |
| JP | 08-289251 | 11/1996 |
| JP | 09-0923492 | 1/1997 |
| JP | 09-116478 | 5/1997 |
| JP | 09-247129 | 9/1997 |
| JP | 1997-298526 | 11/1997 |
| JP | 10-247900 | 9/1998 |
| JP | 11-127485 | 5/1999 |
| JP | 11-205260 | 7/1999 |
| JP | 2000-134182 | 5/2000 |
| JP | 2000-308120 | 11/2000 |
| JP | 2000-350267 | 12/2000 |
| JP | 2001-346265 | 12/2001 |
| JP | 2002-152849 | 5/2002 |
| JP | 2002-17123 | 6/2002 |
| JP | 2003-023659 | 1/2003 |
| JP | 2003-102059 | 4/2003 |
| KR | 19990031857 A | 5/1999 |
| WO | 95/08900 | 3/1995 |
| WO | 96/08934 | 3/1996 |
| WO | 96/37081 | 11/1996 |
| WO | 9859523 A2 | 12/1998 |
| WO | 99/14975 | 3/1999 |
| WO | 99/41853 | 8/1999 |
| WO | 99/45660 | 9/1999 |
| WO | 99/48227 | 9/1999 |
| WO | 99/63682 A2 | 12/1999 |
| WO | 00/05829 | 2/2000 |
| WO | 01/35563 | 5/2001 |

OTHER PUBLICATIONS

Attachment 2, High Speed Data RLP Lucent Technologies, Version 0.1, Jan. 16, 1997.
Azad et al., Multirate Spread Spectrum Direct Sequence CDMA Techniques, 1994, The Institute of Electrical Engineers.

(56) References Cited

OTHER PUBLICATIONS

Azad, et al., "Multirate Spread Spectrum Direct Sequence CDMA Techniques," IEEE Colloquium on Spread Communications Systems, GB, IEE, London, XP000570787, pp. 4-1-4-05, Apr. 15, 1994.
Bell Labs Technical Journal, Lucent Technologies, vol. 2, No. 3, Summer 1997.
Budka et al., Digital Packet Data Networks, Bell Labs Technical Journal, Summer 1997, pp. 164-181.
Cellular Digital Packet Data, System Specification, Release 1.1, Jan. 19, 1995.
Chung, Packet Synchronization and Identification for Incremental Redundancy Transmission on FH-CDMA Systems, 1992, IEEE, pp. 292-295.
Data Service Option for Wideband Spread Spectrum Systems, TIA/EIA Interim Standard, TIA/EIA/IS 707, Feb. 1998.
Data Service Options for Wideband Spread Spectrum Systems. TIA/EIA Interim Standard, TIA/EIA/IS-707-A. Apr. 1999.
Data Service Options for Wideband Spread Spectrum Systems: Introduction, PN-3676.1 (to be published as TIA/EIA/IS-707.1) Mar. 20, 1997 (Content Revision 1).
Data Service Options Standard for Wideband Spread Spectrum Digital Cellular System. TIA/EIA/IS-99. TIA/EIA Interim Standard. Jul. 1995.
Data Service Options Standard for Wideband Spread Spectrum Systems: Packet Data Services. PN-3676.5 (to be published as TIA/EIA/IS-707.5) Ballot Version, May 30, 1997.
Data Standard, Packet Data Section, PN-3676.5 (to be published as TIA/EIA/IS-Data.5), Dec. 8, 1996, Version 02 (Content Revision 03).
Draft Text for "95C" Physical Layer (Revision 4), Part 1, Document #531-981-20814-95C, part 2 on 3GGP2 website (ftp://ftp.3gpp2.org/tsgc/working/1998/1298_Maui/WG3-TG1/531-98120814-95c, %20 part%201.pdf, 1998).
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c, %20part%202.pdf, 1998).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. Proposal for High Speed Packet Data Service, Version 0.1. Lucent Technologies, Jan. 16, 1997.
Elhakeem, Congestion Control in Signaling Free Hybrid ATM/CDMA Satellite Network, IEEE, 1995, pp. 783-787.
Hall et al., Design and Analysis of Turbo Codes on Rayleigh Fading Channels, IEEE Journal on Selected Areas in Communications, vol. 16, No. 2, Feb. 1998, pp. 160-174.
Hattori et al., Wireless Broadband Textbook, IDS Japan, Inc., pp. 47-51 and 110-113 and figures 3 to 17 (Jun. 10, 2002).
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
Honkasalo, Harri. High Speed Data Air Interface. 1996.
I et al., IS-95 Enhancements for Multimedia Services, Bell Labs Technical Journal, pp. 60-87, Autumn 1996.
I et al., Load and Interference Based Demand Assignment (LIDA) for Integrated Services in CDMA Wireless Systems, Nov. 18, 1996, vol. 1, pp. 235-241.
I et al., Multi-Code CDMA Wireless Personal Communications Networks, Jun. 18, 2005.
I et al., Performance of Multi-Code CDMA Wireless Personal Communications Networks, Jul. 25, 1995.
I et al., Variable Spreading gain CDMA with Adaptive Control for True Packet Switching Wireless Network, pp. 725-730.
Introduction to cdma2000 Spread Spectrum Systems, Release C. TIA/EIA Interim Standard. TIA/EIA/IS-2000.1-C. May 2002.
Jeong, et al., "Rate-Controlled Data Transmission for IS-95 CDMA Networks," IEEE Vehicular Technology Conference, US, New York, IEEE, vol. CONF. 47, XP000738626, pp. 1567-15714 May 1997.
Kaiser et al., Multi-Carrier CDMA with Iterative Decoding and Soft-Interference Cancellation, Proceedings of Globecom 1997, vol. 1, pp. 523-529.
Knisely, Douglas, N. Telecommunications Industry Association Subcommittee TR-45.5—Wideband Spread Spectrum Digital Technologies Standards. Banff, Alberta. Feb. 24, 1997 (TR45.5/97.02.24)21.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al., An Access Scheme for High Speed Packet Data Service on IS-95 based CDMA, Feb. 11, 1997.Ejzak et al., Lucent Technologies Air Interface Proposal for CDMA High Speed Data Service, Apr. 14, 1997.
Lau et al., A Channel-State-Dependent Bandwidth Allocation scheme for Integrated Isochronous and Bursty Media Data in a Cellular Mobile Information System, IEEE, 2000, pp. 524-528.
Lim et al., "Implementation Issues on Wireless Data Services in CDMA Cellular and PCS Networks," Gateway to the Twenty First Century. International Conference on Universal Personal Communications. 1996 5th IEEE International Conference on Universal Personal Communications Record (Cat. No. 96th 8185), Proceedings of ICUPC—5th International Conference, 2:582-585, XP00217205 1996, New York, NY, USA, IEEE, USA.
Liu et al., Channel Access and interference Issues in Multi-Code DS-CDMA Wireless Packet (ATM) Networks, Wireless Networks 2, pp. 173-196, 1996.
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Melanchuk, et al., "CDPD and Emerging Digital Cellular Systems," Digest of Papers of COMPCON, Computer Society Conference 1996, Technologies for the Information Superhighway, Santa Clara, CA., No. CONF. 41, pp. 2-8 (Feb. 25, 1996), XP000628458 Institute of Electrical and Electronics Engineers.
Miya, "Satellite Communication Technology (Revised Edition)," The Institute of Electronics and Communication Engineers, Japan, pp. 217-221, Feb. 15, 1985 (no English translation).
Mobile Station-Base Station Compatibility Standard for Wideband Spread Spectrum Cellular Systems, TIA/EIA Standard, TIA/EIA-95-B (Upgrade and Revision of TIA/EIA-95-A) Mar. 1999.
Mobile-Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Motorola, Version 1.0. Motorola High Speed Data Air Interface Proposal Comparisons and Recommendations. Jan. 27, 1997.
MSC-BS Interface (A-Interface) for Public 800 MHz. TIA/EIA/IS-634-A. TIA/EIA Interim Standard (Revision of TIA/EIA/IS-634) Jul. 1998.
MSC-BS Interface for Public 800 MHz.TIA/EIA/IS-634. TIA/EIA Interim Standard, Dec. 1995.
Network Wireless Systems Offer Business Unit (NWS OBU), Feature Definition Document for Code Division Multiple Access (CDMA) Packet Mode Data Services, FDD-1444, Nov. 26, 1996.
Ott, David TR45.5, CDMA WBSS Technical Standards Meeting Summary. Feb. 24-28, 1997 Banff, Alberta.
Packet Data Service Option Standard for Wideband Spread Spectrum Systems, TIA/EIA Interim Standard, TIA/EIA/IS-657, Jul. 1996.
Padgett et al., "Overview of wireless personal communications," IEEE Communications Magazine, vol. 33, Issue 1, pp. 28-41 (Jan. 1995).
Physical Layer Standard for cdma2000 Spread Spectrum Systems, Release C. TIA/EIA Interim Standard. TIA/EIA/IS-2000.2C. May 2002.

(56) References Cited

OTHER PUBLICATIONS

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

Support for 14.4 kbps Data Rate and PCS Interaction for Wideband Spread Spectrum Cellular Systems. TSB74, Dec. 1995. TIA/EIA Telecommunications Systems Bulletin.

*Tantivy Communication, Inc. v. Lucent Technologies, Inc.* Markman Order Civil Action No. 2:04-CV-79 (Aug. 11, 2005).

Telecommunication Industry Association, "Mobile Station-Base Station Compatibility Standard for Dual-Mode Spread Spectrum Systems", TR45, SP-3693-1 (to be published as TIA/EIA-95-B), Publish Version, (Oct. 31, 1998).

Telecommunications Industry Association Meeting Summary. Task Group I, Working Group III, Subcommittee TR45.5. Feb. 24-27, 1997. Banff, Alberta.

Telecommunications Industry Association Meeting Summary. Task Group I, Working Group III, Subcommittee TR45.5. Jan. 6-8, 1997. Newport Beach, California.

Third Generation Partnership Project, "Technical Specification Group Radio Access Network; Technical Specification Group Radio Access Network; Spreading and modulation (FDD) (3G TS 25.213 version 3.1.0)," 3G TS 25.213 V3.1.0 (Dec. 1999).

Third Generation Partnership Project, "Technical Specification Group Radio Access Network; Physical channels and mapping of transport channels onto physical channels (FDD) (3G TS 25.211 version 3.1.0)," 3G TS 25.211 V3.1.0 (Dec. 1999).

Third Generation Partnership Project, "Technical Specification Group Group Radio Access Network; Multiplexing and channel coding (FDD) (3G TS 25.212 version 3.1.0)," 3G TS 25.212 V3.1.0 (Dec. 1999).

Third Generation Partnership Project, "Technical Specification Group (TSG) RAN WG4 UE Radio transmission and Reception (FDD)," TS 25.101 V3.1. 0 (Dec. 1999).

Third Generation Partnership Project, "Technical Specification Group Radio Access Network; MAC protocol specification (3G TS 25.321 version 3.2.0)," 3G TS 25.321 V3.2.0 (Dec. 1999).

Third Generation Partnership Project, "Technical Specification Group Radio Access Network; Services provided by the Physical Layer (3G TS 25.302 version 3.2.0)," 3G TS 25.302 V3.2.0 (Dec. 1999).

Third Generation Partnership Project, "Technical Specification Group Radio Access Network; RRC Protocol Specification (3G TS 25.331 version 3.1.0 Release 1999)," 3G TS 25.331 V3.1.0 (Jan. 2000).

Upper Layer (Layer 3) Signaling Standard for cdma2000 Spread Spectrum Systems, Release C. TIA/EIA Interim Standard. TIA/EIA/IS-2000.5-C. May 2002.

Viterbi, "A Constructive (Backward Compatible) Approach for Migration to Wider Band Wireless Services", Qualcomm Incorporated, $3^{rd}$ Generation Wider Band CDMA Technology Conference, Atlanta, Georgia, (Feb. 25, 1998).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-DCMA, IEEE Global Communications Conference, Phoenix, Arizona, USA, Nov. 3-8, 1007, Gol. III, pp. 1548-1551.

WWW.CDG.ORG/NEWS/PRESS/1997.ASP. CDA Press Release Archive, 1997.

Kikuchi et al., "Internet cost reduction realized,—10—Part 3, Key to the cost reduction—Utilize existing and wireless lines," No. 749, pp. 137 to 146 (Aug. 9, 1999). (English version not available—the Office Action in which the reference was cited has been provided).

METHOD AND APPARATUS FOR A SPECTRALLY COMPLIANT CELLULAR COMMUNICATION SYSTEM

CROSS REFERENCE TO RELATED APPLICATIONS

This application is continuation of U.S. patent application Ser. No. 12/183,780 filed Jul. 31, 2008, which issued as U.S. Pat. No. 8,755,360 on Jun. 17, 2014, which is a divisional of U.S. patent application Ser. No. 10/409,031 filed Apr. 7, 2003, which issued as U.S. Pat. No. 8,463,255 on Jun. 11, 2013, which is a continuation in part of U.S. patent application Ser. No. 09/467,353 filed Dec. 20, 1999, which issued as U.S. Pat. No. 6,545,990 on Apr. 8, 2003, which are incorporated by reference as if fully set forth.

BACKGROUND OF THE INVENTION

The evolution of communication technologies continues to drive user preferences in the manner of access to networks. Wireless networks, especially for voice communications, now provide coverage in most areas of the industrialized world. Indeed, wireless voice communications are becoming a preferred method in many instances because of their convenience. In certain situations, it may even be less expensive to use a wireless telephone. For example, wireless phone service may actually be less expensive than bringing a second wired telephone into a home, or in remote areas.

At the same time, demand for data communication services and in particular demand for reliable high speed access to the Internet is also growing. This demand is growing so fast that local exchange carriers (LECs) are concerned that the demand will cause their networks to fail. It is expected that as time goes on, at least some of this demand will eventually shift to the wireless side, especially with the popularity of laptop computers, personal digital assistants, and other portable computing devices increasing.

At the present time, there are difficulties integrating available wireless data systems with existing computer network infrastructure. To provide coverage to an area requires planning of various network components, as well as obtaining necessary licensing to access the airwaves from government authorities. In particular, not only must wireless modulation schemes be chosen from among the myriad of possibilities, including analog modulation standards such as AMPS, TACS and NMT, but also the emerging digital standards, including Time Division Multiple Access (TDMA) schemes such as Global System for Module (GSM) communications, and Code Division Multiple Access (CDMA). In addition, site locations for base station equipment must be chosen and acquired. Additional engineering is often required to determine proper tower heights, effective radiated power levels, and assignment of a frequency plan to an area within which wireless service is desired.

Although it provides almost ubiquitous coverage, the existing cellular voice infrastructure has been very expensive to build-out. Therefore, the most common method of using the cellular infrastructure to send data is quite analogous to how computers presently use wired telephones. In particular, digital data signals are first formatted by modem equipment to generate audio tones in the same manner as used for the wireline network. The audio tones are then fed to cellular voice transceiving equipment which modulates these tones according to the interface scheme in use. For example, an input data stream such as produced by a computer is first modulated to generate frequency shift keyed (FSK) signals at audio frequencies. The FSK audio signal is then modulated using, for example, the IS-95B standard for CDMA modulation such as is prevalent in the United States. This modulation scheme impresses a pair of codes on a given radio frequency signal including a pseudorandom noise (PN) spreading code and an orthogonal code to define multiple traffic channels.

It is also possible to use separate networks built specifically for data services such as so-called Cellular Packet Data (CDPD) networks. However, CDPD coverage is not nearly as ubiquitous as the coverage presently provided for cellular voice communications. This is most likely because the build-out of a CDPD network requires all of the costs associated with building out a separate network, including planning of base station sites, obtaining licensing, acquiring such sites and engineering their tower heights and radiated powers and frequency planning.

As mentioned above, the most popular communication scheme for voice cellular networks at the present time is based upon CDMA modulation. These standards dictate a radio frequency (RF) channel bandwidth of 1.2288 megahertz (MHz). Therefore, RF system planning engineers and component industries have standardized their products based upon this particular channel bandwidth, and these networks have been built out with radio equipment, site locations, tower heights, and frequency plans that assume this channel spacing.

Unfortunately, these CDMA standards also specify other parameters for the communication which are not optimized for data traffic. These include the soft handoff processing needed to transfer control of a call from one base station to another with the cooperation of the subscriber unit. The requirements reduce overall system capacity since individual users may be communicating with two or more base stations at any given time.

Furthermore, existing CDMA protocols for wireless service assume that connections are to be maintained for the duration of a call. This is quite unlike the typical Internet connection which is quite irregular in its actual demand for information. For example, after requesting a Web page, the typical Internet user then expects a relatively large amount of data to be downloaded. However, the user then spends many seconds or even minutes viewing the Web page before additional information needs to be transmitted.

SUMMARY OF THE INVENTION

Briefly, the present invention is a system for wireless data transmission that uses a channel bandwidth, channel separation, and radio frequency power spectrum which are compatible with existing deployments of wireless voice and data networks. However, the wireless data protocol specifies digital coding, modulation, channel use allocation, and power control schemes that are optimized for data communications. Thus, the transmitted waveforms, although appearing to be of a different format when viewed from a time domain perspective are, in general, compatible from a frequency domain perspective with existing cellular networks.

As a result, a data communication system utilizing this wireless data protocol has the same appearance from a radio frequency network planning perspective as a standard cellular system. Thus, from a service provider's point of view, an optimized data service can be deployed using the same base station locations, tower heights, cell sites, and cell radii, as well as frequency reuse plans that were already developed for existing voice and data networks. However, from the perspective of the Internet service provider and the user, the system is optimized for data transmission.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
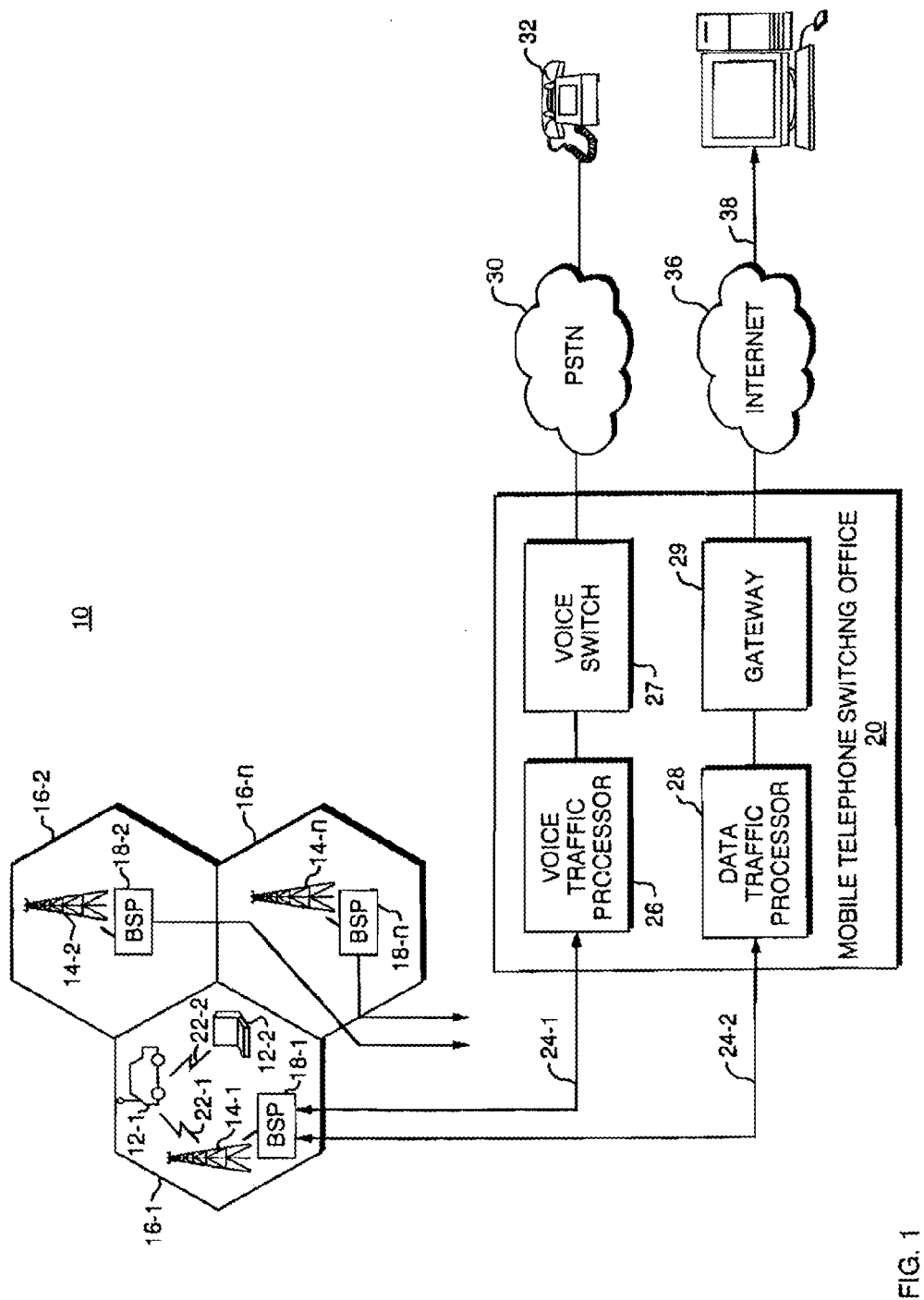
FIG. 1 is a high level block diagram of a system for providing wireless data service according to the invention.

FIG. 1 illustrates a cellular radio telephone communication system 10. As in the prior art, the system 10 includes one or more mobile users or subscribers 12, including a voice subscriber unit 12-1 such as associated with a moving vehicle, and a data subscriber unit 12-2 such as associated with a laptop computer. Base stations 14-1, 14-2, 14-n are each associated with one of a number of cells 16-1, 16-2, . . . , 16-n with each cell 16 representing portions of an area within which the system 10 is providing wireless communication. Each base station 14 also has an associated base station processor BSP 18. A mobile telephone switching office 20 couples traffic and control signaling between other networks 30, 36 and each of the base station processors 18. Although only three cells 16 are shown in FIG. 1, a typical system 10 may include hundreds of base stations 14 and cells 16 and thousands of subscriber units 12.

The cellular network 10 provides a duplex radio communication link 22 between each base station processor 18 and mobile subscriber units 12 traveling within the associated cell 16. The function of the base station processor 18 is mainly to manage radio communication with the subscriber unit 12. In this capacity, the base station processors 18 serve chiefly as relay stations for both data and voice signals.

With the present invention, however, the base station processor 18 separately handles voice and data traffic. In particular, radio channels associated with servicing the voice units 12-1 are handled differently from the radio channels associated with handling the data traffic for the data user 12-2. Thus, these radio channels are respectively coupled to different circuits in the mobile telephone switching office 20. For example, different radio channels are associated with servicing the mobile voice unit 12-1 than the channels associated with servicing the data subscriber unit 12-2. More specifically, circuits 24-1 associated with voice traffic connect to a voice traffic processor 26 within the mobile telephone switching office 20. Voice signals are then routed through a voice switch 27 to a voice network such as the Public Switched Telephone Network (PSTN) 30 and on to a destination telephone 32. Voice traffic heading in the forward direction from the telephone 32 to the mobile unit 127 is handled in an analogous way, but in reverse order.

On the other hand, data signals associated with the data subscriber unit 12-2 are first coupled to a different circuit 24-2 to a data traffic processor 28. The data signals are in turn fed through a gateway 29 such as may be a router, data switch, concentrator, or other network point-of-presence to provide connections to a data network such as the Internet 36. The data signals are eventually coupled to and from a destination such as a computer 38 which may, for example, be an Internet server.

Cellular telephone systems have traditionally employed analog modulation schemes such as frequency division multiple access (FDMA) to carry signals between the subscriber units 12 and the base station 13 wherein a radio telephone communication channel includes one or more carrier frequency bands which are dedicated to each user for the duration of a particular call. To provide greater channel capacity and to more efficiently use the radio spectrum, however, present emerging networks now operate using digital modulation schemes such as time division multiple access (TDMA) or code division multiple access (CDMA). Communications in a TDMA system occur by assigning a series of time slots on each carrier frequency band, with individual subscriber units typically being allocated one or more time slots. Of more interest to the present invention are CDMA systems, in which each user is assigned one or more unique channel codes. Each channel code corresponds to a digital modulation sequence used for spreading the transmit energy of the communication signals over a broad bandwidth. A receiving station uses the same code to despread the coded signal and recover the base band information.

Figure 2:
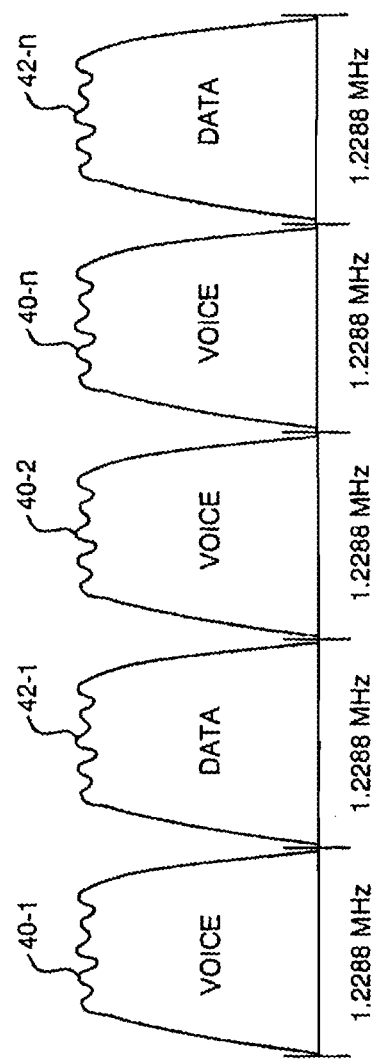
FIG. 2 is a frequency domain plot of the channel spacing used with the invention.

One such CDMA scheme in widespread use in the United States is specified as Telecommunications Industry Association (TIA) standard IS-95B. As shown in FIG. 2, the IS-95B standard specifies that an IS-95A voice channel 40-1, 40-2, . . . , 40-n occupy a bandwidth of 1.2288 MHz, even though such voice signal may have originated only as a several kilohertz bandwidth signal. Thus, the effect of the spreading codes is to greatly increase the required bandwidth of each channel although many different subscribers 12 may be sharing the channel at any given time.

In accordance with the invention, certain coded traffic channels 40-1, 40-2, 40n, are associated with servicing mobile voice units 12-1 whereas other coded traffic channels 42-1 are associated with servicing data subscribers 12-2. More specifically, the channel coding, channel allocation, power control, and handoff schemes used for the voice channels 40 may be compliant with industry standard IS-95B. However, the data channels 42, are also compliant with the voice channels 40 from a frequency bandwidth and power spectrum perspective. In particular, the data channels 42 appear as shown in FIG. 2 to be identical to the voice channels from a frequency domain perspective. However, they use a channel coding, channel allocation, handoff, and power control scheme which is optimized for Internet Protocol (IP)-type data access and which is different from the channel coding used for the voice channels. While the data channels may use a CDMA-type encoding, it is not the same as the CDMA encoding used for the voice channels.

Although the compliance with the frequency bandwidths and power spectrum of IS-95B air interface standard is provided as an example, the invention is not intended to be so limited. Embodiments of the invention may be employed with a variety of digital air interface standards for voice and data signal communication. For example, embodiments of the invention may be employed with the TIA IS-2000 digital air interface standard, which provides for 800 MHz cellular mobile telecommunications systems and 1.8 and 2.0 GHz Personal Communications Services (PCS) systems. Likewise, embodiments of the invention may also be employed with the CDMA2000 (IS-856) digital air interface standard for spread spectrum systems, or still other air interface standards, so long as they have a defined channel bandwidth.

Figure 3:
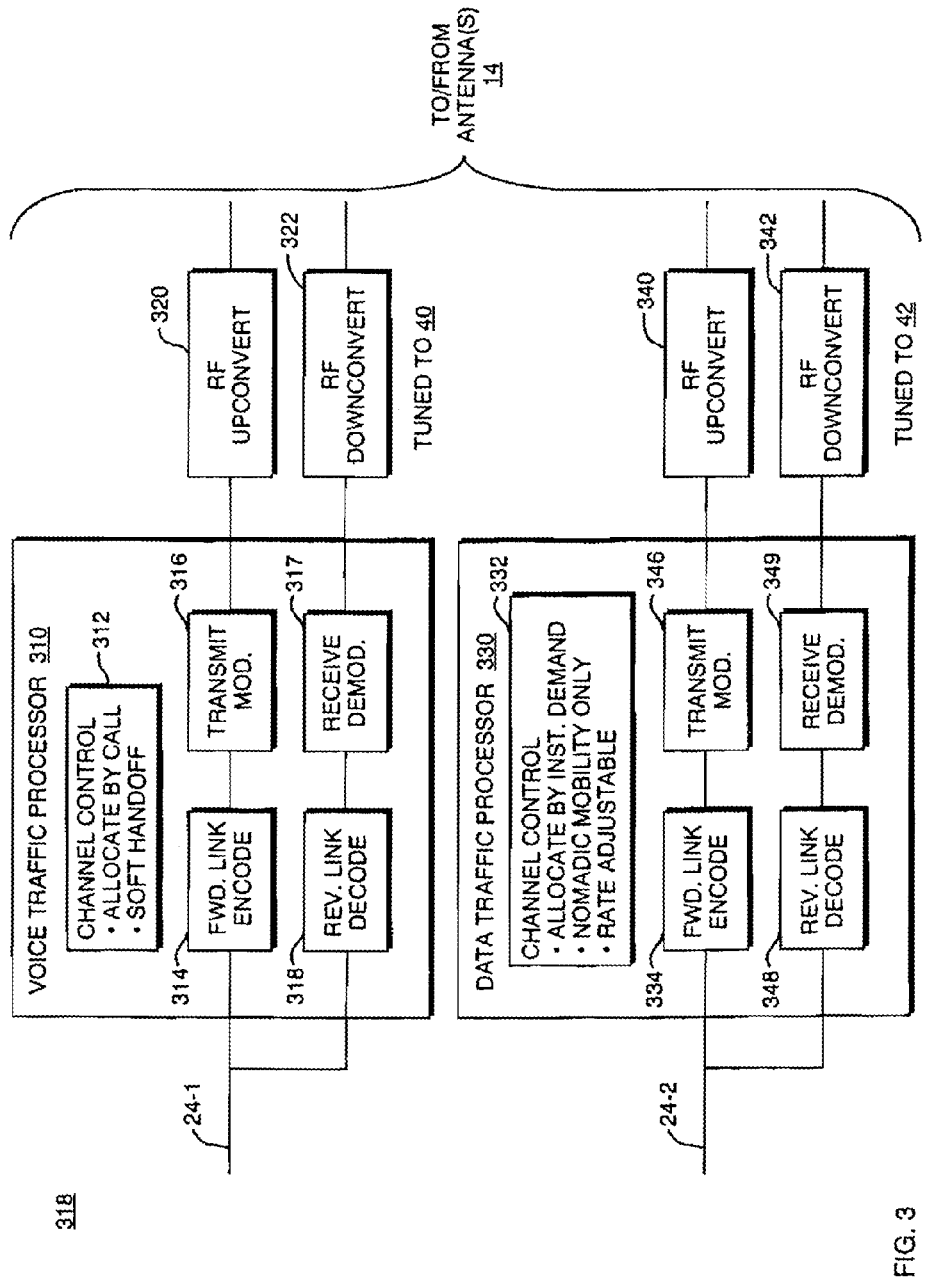
FIG. 3 is a more detailed view of the components of a base station processor.

FIG. 3 is a more detailed view of how a typical base station processor 18 handles voice and data signals differently according to the invention. The base station processor 18 consists of a voice traffic processor 310 including a voice channel controller 312, and forward link components, including a forward link encoder 314, and transmit modulator 316, as well as reverse link components, including a receive demodulator 317 and reverse link decoder 318. Completing the circuits which process voice channels are a voice channel radio frequency (RF) upconverter 320 and RF downconverter 322.

Also included within the base station processor 18 is a data traffic processor 330 which includes a data channel controller 332, forward link encoder 334, transmit modulator 346, reverse link decoder 348, and receive demodulator 349. Also forming part of the data handling circuits are a data channel RF upconverter 340 and RF downconverter 342.

The voice traffic processor 310 and RF up- and downconverter circuits 320 and 322 operate essentially as in the prior art. For example, these circuits are implemented in accordance with the IS-95B air interface standard, to provide duplex voice communications between the mobile subscriber unit 12 and the mobile telephone switching office 20. In particular, in the forward direction, that is, for voice signals traveling from the PSTN through the MTSO 20 towards the subscriber unit 12, channel signals received over the network connection 24-1 are fed to the forward link encoder 314. The network connection 24-1 may, for example, use a carrier-grade multiplex circuit over digital transport cabling such as T1 carrier circuits.

The IS-95 standard specifies that the forward link encoder 314 encodes the signal with a pseudorandom noise (PN) spreading code and orthogonal Walsh code to define the voice channel. A transmit modulator then impresses the desired modulation such as quadrature phase shift key (QPSK) modulation onto this signal, which is then forwarded to the RF upconverter 320. Although the use of spread spectrum modulation of the IS-95 standard is provided as an example, it is not intended to be so limited. For example, embodiments of the invention may employ a modulator which uses single carrier Time Division Duplex (TDD) to provide multiple slotted channels on a radio frequency carrier.

In the reverse link direction, that is, for signals traveling from the mobile unit 12 through the base station 18 towards the mobile telephone switching office 20, signals received from the RF downconverter 322 are passed to the receive demodulator 317 and reverse link decode circuits 318. The receive demodulator 317 removes the modulation from the signals, with the reverse link decoder 318 then stripping off the pseudorandom noise and Walsh channel coding to provide a digitized voice signal to the network connection 24-1.

The voice channel RF upconverter 320 and RF downconverter 322 are tuned to the channels 40 that are devoted to voice traffic. Specifically, only channels devoted to voice traffic are allowed to be allocated by the voice channel controller 312 to the voice traffic processor 310. In addition, the voice channel controller 312 also controls the remainder of the circuits of the voice traffic processor 310 in accordance with the IS-95B standard. For example, radio channels 40 are allocated on a per-call basis. That is, whenever a user of a mobile subscriber unit 12 wishes to place a call by dialing a telephone number of the destination telephone 32, the channel controller 312 opens and maintains an RF forward link channel and RF reverse link channel by activating encoder 314, decoder 318, modulator, and demodulator circuits of the traffic processor 310, dedicating those channels to that call as long as the call is in progress.

In addition, functions associated with mobility such as call handoff, in particular the soft handoff algorithms dictated by IS-95B, are performed also by the voice channel controller 312.

Turning attention now to the data traffic processor 330, it will now be explained how these circuits handle their signaling in a different way than the voice traffic processor 310. In the forward link direction, signals are received from a data transport media 24-2 and are fed to a forward link encoder 334 and transmit modulator 346. However, the forward link encoder 334 and transmit modulator 346 operate differently than the corresponding components 314 and 316 in the voice traffic processor 310. One such difference relates to the fact that (as will be described in greater detail in connection with FIGS. 4 and 5) forward error correction (FEC) coding rates are adapted for individual channels to allow different coding rates to be assigned to each user. In addition, the forward link encoder and transmit modulators are only allocated on an instantaneous demand basis. Thus, steps are taken to ensure that coded data radio channels are only allocated to data subscribers 12-2 which actually have data ready to be transmitted or received.

The data channel controller 332 responsible for allocating radio channels to the data subscriber 12-2 also handles mobility and handoff of data calls in a way which is different from the channel controller 312 associated with the voice traffic processing 310. In particular, the data channel controller 332 in the preferred embodiment supports nomadic-type mobility only. That is, the data users 12-2 are not expected to cross a boundary between two cells 16-1 and 16-2, for example, during the duration of an active connection. However, the system 10 does provide service if, for example, a data user 12-2 disconnects, at least the radio connection, moves to a different cell, and then reestablishes a radio connection.

Figure 4:
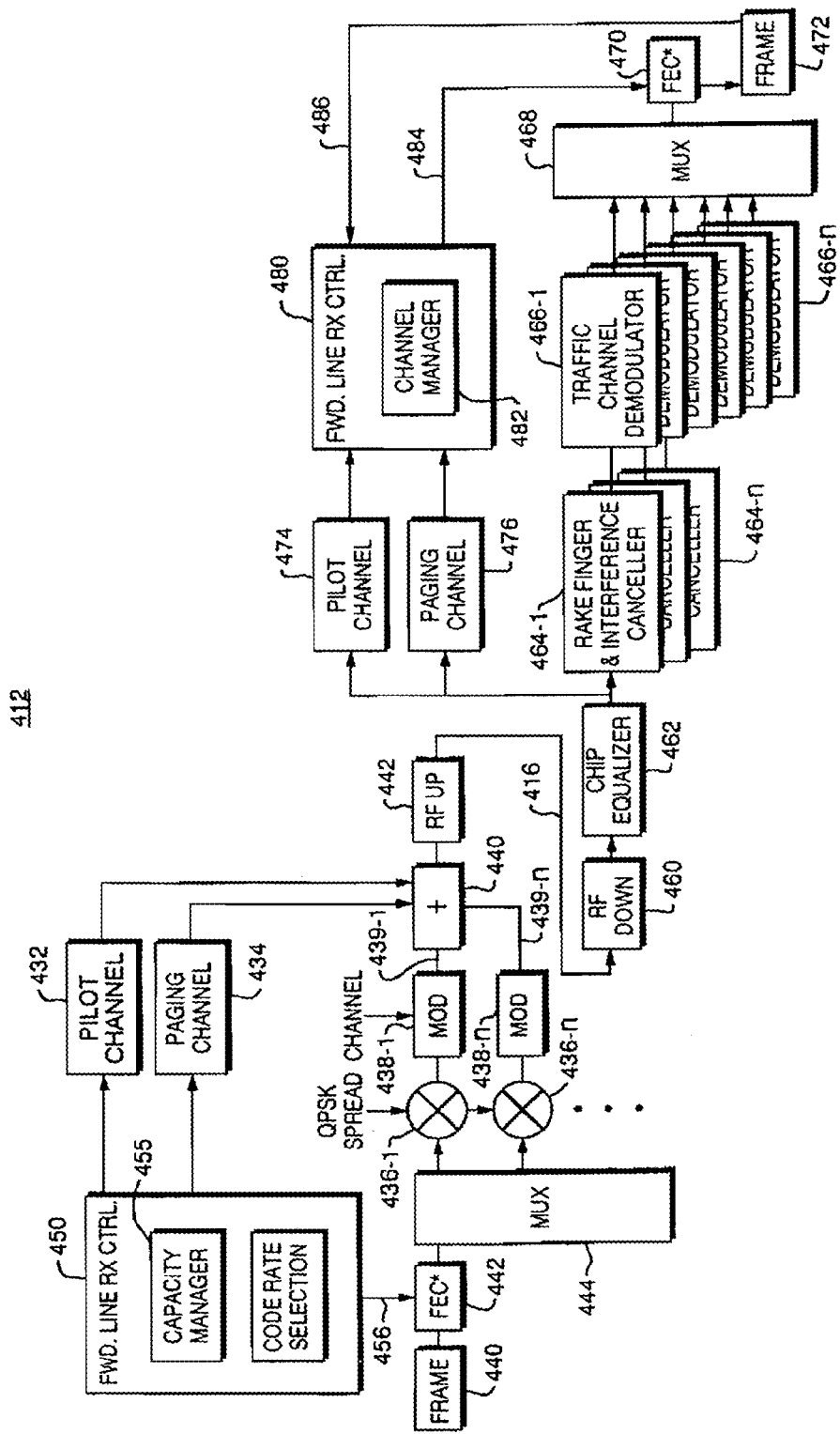
FIG. 4 is a detailed diagram of components of a base station and subscriber unit used to implement forward link communication.

The data traffic processor 330 will be described in greater detail now in connection with FIG. 4. This figure illustrates a detailed view of the forward link processing used to transmit data signals from the base station 18 to the data subscriber units 12-2. In the base station 18, these include a forward link transmit controller 450 and signal processing circuits which generate the various signals making up the forward link transmitted signals. These include circuits for implementing functions such as a pilot channel 432, paging channel 434, and one or more traffic channels 436. As it is known in the art, the pilot channel 432 is responsible for generating known continuous pilot signals that permit receiver circuits in the subscriber unit 12 to properly synchronize to signals transmitted by the base station 18. The paging channel 434 sends control signals to the subscriber unit 12 to, for example, allocate traffic channel capacity over the forward link 416. For example, the paging channel 434 is used to send messages to the subscriber unit 12 when it is necessary to allocate a traffic channel on the forward link to send messages.

The traffic channel 436 provides a physical layer structure for sending payload data over the forward link. In a preferred embodiment, CDMA encoding is used to define the pilot channels 432, paging channels 434, as well as the traffic channels 436. More specifically, the traffic channel circuitry 436 includes symbol framing function 440, forward error correction logic 442, a multiplexer 444, a summer 450, and radio frequency (RF) upconverters 452.

Data which is to be sent over the forward link 416 is first fed to the framing function 440. The framing function 440 packages input payload data into conveniently sized groups referred to as frames. The size of these pre-encoded frames will vary depending upon the particular forward error correction (FEC) coding scheme selected at any given time by the FEC encoder 442. What is important is that the combination of the framers 440 and FEC encoder 442 produce a fixed number of output FEC symbols in each given transmitted frame.

Figure 5:
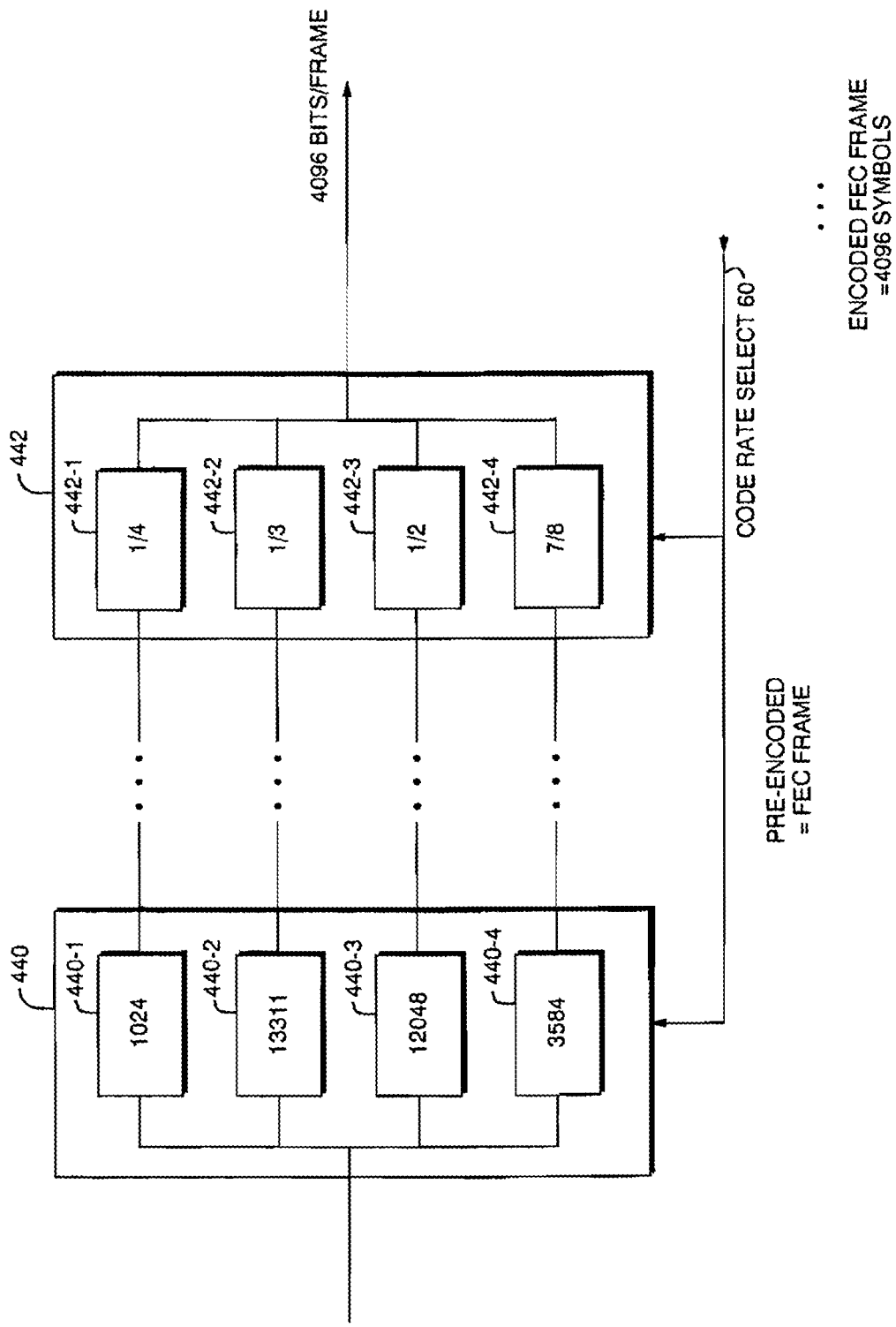
FIG. 5 is a diagram depicting how different selectable data rates may be supported.

FIG. 5 is a diagram showing how the framers 440 and FEC encoders 442 are selected in pairs to accomplish this end result. The fixed output FEC frame size in the illustrated embodiment is 4096 symbols. This embodiment uses four different FEC symbol encoders 442-1, 442-2, 443-3 and 442-4 providing, respectively, a ¼, ⅓, ½, and ⅞ rate encoding. The coding rate of each FEC symbol encoder 442 indicates the ratio of the number of input bits to the number of output bits. The actual codes used by the FEC encoders 442 may be any of a number of different types of error correction codes such as R, thus, a higher information rate is obtained with higher rate FEC code.

This embodiment also uses four framer circuits 440-1, 440-2, 440-3, 440-4 corresponding to the four FEC encoders 442-1, 442-2, 443-3 and 442-4. For example, the ¼ rate encoder 442-1 requires a ¼ rate framing circuit 440-1 which groups incoming bits into pre-coded FEC groups of 1024 bits, producing the desired 4096 output symbols. Similarly, the ⅓ rate encoder 442-2 requires a ⅓ rate framer 440-2 to group incoming bits into pre-encoded sets of 1331 bits. The ¼ rate encoder 442-3 uses a framer 440-3 with a pre-encoded set size of 2048, and ⅞ encoder 442-4 uses a framing circuit 440-4 with the pre-encoded size of 3584 bits.

Framing circuit 440 and FEC encoder 442 thus only utilize one of the specific framers 440-1, 440-2, 440-3, or 440-4, and one of the specific encoders 442-1, 442-2, 443-3 and 442-4 at any given point in time. Which particular framing circuit 440 and FEC encoder 442 is activated is controlled by coding rate control signal 456 input to each of the framing circuits 440 and encoder 442. The code rate select signal 456 is generated by the forward link transmit controller 450.

A given connection may require multiple traffic channels to be allocated to at a particular time. For example, the demultiplexer 444 accepts the signal produced by the FEC encoder 442 being to multiple spreading circuits 436-1 and channel modulators 438-1 which impress not only the quadrature phase shift keyed (QPSK) modulation, but also the appropriate pseudorandom noise (PN) and/or Walsh orthogonal coding in order to produce multiple CDMA channel signals 439-1, . . . , 439-n. As mentioned previously, the QPSK spreaders 436 and modulators 438 ensure that the modulated bandwidth and power spectrum of the forward link signal produced by the data traffic processor 330 is the same as the modulated bandwidth and power spectrum of the modulated voice signals produced by the voice traffic processor. These multiple CDMA traffic signals are then summed by the summer 440, together with the pilot channel signal produced by the channel pilot circuits 432 and the paging signal produced by the paging channel circuit 434 before is fed to the RF up converter 442. Although the use of CDMA is provided as an example, it is not intended to be so limited. For example, embodiments of the invention may employ a modulator which uses single carrier Time Division Duplex (TDD) to provide multiple slotted channels on a radio frequency carrier.

The forward link transmit controller 450, which may be any convenient suitable microcontroller or microprocessor, has among its software programs a process referred to as the capacity manager 455. The capacity manager 455 not only allocates one or more of the channel modulators 448 to a specific forward link traffic channel, but also sets the value for the code rate select signals 456. In addition, the capacity manager 455 sets power levels for a particular forward link signals 416.

A single capacity manager 455 in a base station processor 12 may manage multiple traffic channel circuits, setting their respective code rate select signal 456 according to observed conditions in a corresponding traffic channel. These adjustments to the channel physical layer characteristics are made preferably in response to determining a signal strength value, such as by measuring a ration of the energy per data bit divided by a normalized noise power level (Eb/No) at the receiver.

Thus, in addition to changing the power level of the individual modulated signals generated by the modulators 448, it is also possible with a system according to the invention to control the Eb/No at the receiver by adjusting the value of code rate select signal 456 in order to select different code rates under different conditions.

For example, if a remote access unit 12 located deep inside of building is experiencing particularly adverse multipath or other distortion conditions, in the past it would have been thought to be necessary to increase the power level of the forward link 16-n in order to obtain an appropriate received signal level at the access unit 12. However, with the invention, if a full maximum data rate is not needed, then the coding rate implemented by the FEC encoder 442 can be lowered.

And in other environments where multipath distortion is minimal, such as in a direct line of sight situation, the highest code rate generate 442-4 can be selected while at the same time reducing the radiated power level on forward link for that particular channel. This, therefore, maximizes the available data rate for given user while also minimizing interference generated to other users of the same radio channel.

Thus, in environments where propagation is good, the system 10 can increase the data rate to a given user without introducing additional interference to other users. However, in a bad signaling environment, an advantage is also obtained since each particular user channel can be made more robust without increasing its power level.

Continuing to pay attention to FIG. 4, various components of the receiver portion of the access unit 12 will be discussed in more detail. These consist of an RF downconverter 460, equalizer 462, multiple rake receivers 464-1, . . . , 464-n, multiple channel demodulators 466-1, . . . , 466-n, a multiplexer 468, an FEC decoder 460, and framing circuit 472.

The RF downconverter 460 accepts the forward link signal, producing a baseband digitized signal. The chip equalizer 462 provides equalization of individual chips of the received signal, fitting it to several rake finger and interference cancellation circuit 464-1. These circuits cooperate with multiple channel demodulator 466-1 in a manner which is known in the prior art and a strip off the CDMA encoding on each channel. Pilot receiving circuit 474 and paging signal receiving circuit 476 similarly are adapted for receiving the pilot channel signal generated by and the paging signal generated by the base station processor 12. The multiplexer 468 reconstructs signals in the situation where multiple traffic channels were allocated to the particular connection.

A forward link receive controller 480 executes programs which set various parameters of the components of the traffic channel circuit 58. Of particular interest here is the fact that this controller 480 executes a management process 482 which determines the coding rate select signal 484 to be sent to the FEC decoder 470.

Specifically, the coding rate selected by the FEC decoder 470 at the receiving portion of access unit 12 must be the same as the coding rate of the FEC encoding at the transmitting base station processor 18 in order for the receiving framing circuit 472 to correctly reproduce the input data signal. Thus, in order for the system 10 to adapt to changing conditions in the RF link, it is necessary for the station processor 18 to communicate this information to the access unit 12 in some manner.

For example, if it is desired to allow the coding rate to change during the duration of a connection, which is the case in the preferred embodiment, the paging channel 434 may initially include, during a channel acquisition sequence or commands to inform the access unit 12 not only of the different encoded and modulated carrier frequencies on which it will be communicating, but also to inform it of the particular encoding rate that it will be using. Then, as a connection remains open and coding rates that are optimum change over time, additional control messages may be embedded in the traffic channel itself. In the preferred embodiment, this is accomplished by embedding a command message within the received data which is fed back to the controller 480 via a command signal input 486.

It should be understood that measures of link quality can also be determined by the controller 480 from the output signal 486 and periodically sent back to the controller 450 in the base station 18 via a command structure on a reverse link channel (not shown). This permits the controller 450 at the base station processor 12 to appropriately set optimum FEC coding rates to be used by the FEC encoder 442 and the FEC decoder 470 for particular connections.

Figure 6:
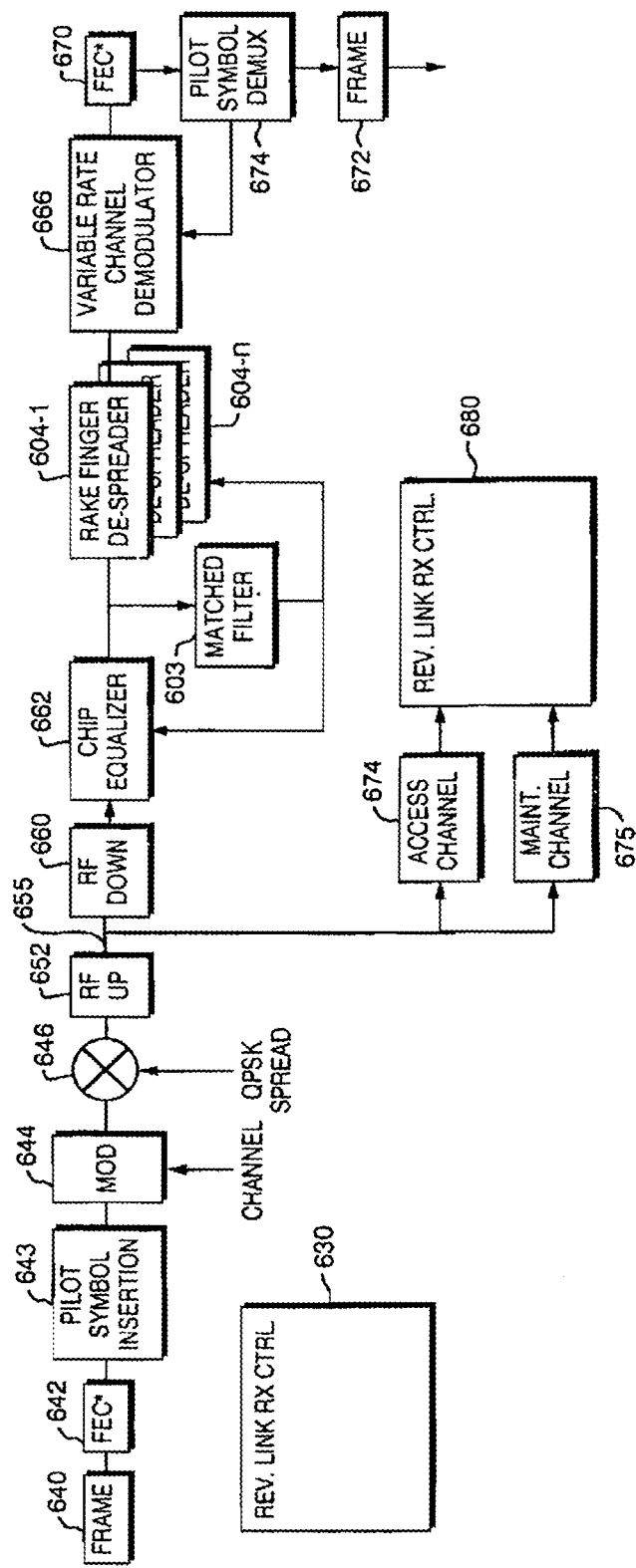
FIG. 6 is a detailed diagram of components used to implement reverse link communication.

Turning attention now to FIG. 6, the reverse link implementation will be described in more detail.

The forward link controller 430 uses a capacity manager 436 that bases allocation of traffic channels on the forward link 416 depending upon demand, and continues demand bases rather than upon per call basis. That is, as a user comes on line a connection may be established between a user and a network layer connector computer. However, this connection is maintained in a logical sense although radio channels may not be allocated to the user when data need not be sent.

Functions analogous to those provided by the forward link are provided by the reverse link. Specifically, in the transmit direction on the reverse link, a framing circuit 640, and an FEC encoder 642 operate as for the forward link previously described in connection with FIG. 4. However, on the reverse link, there is no specific pilot channel dedicated for transmission of a continuous pilot signal. Instead, pilot symbols are inserted among the data by the pilot symbol insertion mark 643. Channel modulator 644, QPSK spreader 646, and RF upconverter 652 provide the transmitted reverse link signal 655.

The reverse link signal 655 then propagates from the access unit towards the base being first received by the RF downconverter 660. The RF downconverter steers access signals to the access channel block 674 and maintenance channel signals to the maintenance channel signal block 675. These provide information to the reverse link receiver controller 680 to permit the remainder of the components to accurately demodulate the data to determine the FEC encoding and decoding rates, and other functions.

These components include a chip equalizer 662, which provides a function analogous to the chip equalizer 462 in the forward link receiver as previously described, a matched filter 663, which assists in separating data symbols from pilot symbols, and a set of rake finger despreaders 664-1 ... , 664-n providing a function analogous to the rake finger receivers 464 previously described. The variable rate channel demodulator 666 operates similarly to the channel demodulator 466 previously described. Finally, an FEC decoder 670 and pilot symbol demultiplexer 674 remove data symbols from the decoded signal, and in connection with framing logic 672, produce the output data.

It should be apparent that any optimized data service can be provided over the data channels, as long as the dedicated data channels are compliant in a frequency bandwidth and power spectrum.

For example, the IS-856 standard, generally referred to as "CDMA2000 High Rate Packet Data Air Interface Specification," specifies an optimized data service for high rate packet data that may be provided over the dedicated data channels. For more information, refer to the IS-856 standard as published by the Telecommunication Industry Association/Electronic Industries Alliance (TIA/EIA).

The T1.PP.723 standard, generally referred to as the "I-CDMA Spread Spectrum Systems Air Interface Standard," specifies an optimized data service that may be provided over the dedicated data channels. For more information, refer to the T1.PP.723 standard available from Alliance for Telecommunications Industry Solutions.

Another emerging standard, generally referred to as the Institute of Electrical and Electronic Engineers (IEEE) 802.20 "Mobile Broadband Wireless Access (MBWA)," also provides optimized data services for the transport of IP based services and may be provided over the dedicated data channels. For more information, refer to the IEEE 802.20 standard available from the Mobile Broadband Wireless Access (MBWA) Working Group.

The Universal Mobile Telecommunication System—Frequency Division Duplex (UMTS-FDD) standard specifies optimized data services that may be provided over the dedicated data channels. An example of a UMTS-FDD data service is the data optimized variant of 5 Megahertz (MHz) W-CDMA available from SOMA Networks of San Francisco, Calif. For more information, please refer to the UMTS-FDD standard available from the $3^{rd}$ Generation Partnership Project (3GPP).

The Universal Mobile Telecommunication System—Time Division Duplex (UMTS-TDD) standard also specifies optimized data services that may be provided over the dedicated data channels. IPWireless, Inc. of San Bruno, Calif. provides a packet data implementation of the UTMS-TDD standard for its mobile broadband technology. For more information, please also refer to the UMTS-FDD standard available from the $3^{rd}$ Generation Partnership Project (3GPP).

Although these standards are provided as examples of optimized data services which can be provided over the dedicated data channels, these examples are not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A code division multiple access (CDMA) subscriber unit comprising:
   circuitry configured to receive a forward link CDMA code channel and a forward link packet data channel; wherein the forward link packet data channel has a varying number of CDMA codes; wherein the circuitry is further configured to transmit a reverse link CDMA code channel and a reverse link packet data channel; wherein the reverse link packet data channel has a varying number of CDMA codes.

2. The CDMA subscriber unit of claim 1 wherein the forward link CDMA code channel carries voice data.

3. The CDMA subscriber unit of claim 1 wherein the reverse link CDMA code channel carries voice data.

4. The CDMA subscriber unit of claim 1 wherein CDMA code channels have an orthogonal code and a pseudo noise code.

5. The CDMA subscriber unit of claim 1 wherein the forward link and reverse link CDMA code channels are configured for soft handover and the forward link packet data channel is not configured for soft handover.

6. The CDMA subscriber unit of claim 1 wherein the forward link packet data channel is ⅓ rate forward error correction (FEC) encoded.

7. A code division multiple access (CDMA) base station comprising:
    circuitry configured to transmit a forward link CDMA code channel and a forward link packet data channel; wherein the forward link packet data channel has a varying number of CDMA codes; wherein the circuitry is further configured to receive a reverse link CDMA code channel; wherein the circuitry is further configured to receive a reverse link packet data channel; wherein the reverse link packet data channel has a varying number of CDMA codes.

8. The CDMA base station of claim 7 wherein the forward link CDMA code channel carries voice data.

9. The CDMA base station of claim 7 wherein the reverse link CDMA code channel carries voice data.

10. The CDMA base station of claim 7 wherein CDMA code channels have an orthogonal code and a pseudo noise code.

11. The CDMA base station of claim 7 wherein the forward link and reverse link CDMA code channels are configured for soft handover and the forward link packet data channel is not configured for soft handover.

12. The CDMA base station of claim 7 wherein the forward link packet data channel is ⅓ rate forward error correction (FEC) encoded.

13. A method comprising:
    receiving, by a code division multiple access (CDMA) subscriber unit, a forward link CDMA code channel and a forward link packet data channel; wherein the forward link packet data channel has a varying number of CDMA codes; and transmitting, by the CDMA subscriber unit, a reverse link CDMA code channel and a reverse link packet data channel; wherein the reverse link packet data channel has a varying number of CDMA codes.

14. The method of claim 13 wherein the forward link CDMA code channel carries voice data.

15. The method of claim 13 wherein the reverse link CDMA code channel carries voice data.

16. The method of claim 13 wherein CDMA code channels have an orthogonal code and a pseudo noise code.

17. The method of claim 13 wherein the forward link and reverse link CDMA code channels are configured for soft handover and the forward link packet data channel is not configured for soft handover.

18. The method of claim 13 wherein the forward link packet data channel is ⅓ rate forward error correction (FEC) encoded.

* * * * *